US010922396B2

(12) United States Patent
Young

(10) Patent No.: US 10,922,396 B2
(45) Date of Patent: Feb. 16, 2021

(54) SIGNALS-BASED AUTHENTICATION

(71) Applicant: Bank of America Corporation, Charlotte, NC (US)

(72) Inventor: Michael Robert Young, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 115 days.

(21) Appl. No.: 16/390,299

(22) Filed: Apr. 22, 2019

(65) Prior Publication Data

US 2020/0334345 A1    Oct. 22, 2020

(51) Int. Cl.
*G06F 21/00*    (2013.01)
*G06F 21/32*    (2013.01)
*G06K 9/00*    (2006.01)

(52) U.S. Cl.
CPC ......... *G06F 21/32* (2013.01); *G06K 9/00503* (2013.01); *G06K 9/00536* (2013.01)

(58) Field of Classification Search
CPC ........... H04W 12/06; H04W 12/00503; H04W 12/08; H04W 12/0051; H04W 12/00506; G06F 21/31; G06F 21/32
USPC ............... 726/2, 4, 19, 27, 29; 713/168, 186
See application file for complete search history.

(56) References Cited

U.S. PATENT DOCUMENTS

| | | | |
|---|---|---|---|
| 6,154,879 A | 11/2000 | Pare, Jr. et al. | |
| 8,161,530 B2 | 4/2012 | Meehan et al. | |
| 8,260,740 B2 | 9/2012 | Davis et al. | |
| 8,352,730 B2 | 1/2013 | Giobbi | |
| 8,443,202 B2* | 5/2013 | White | G06F 21/32 713/186 |
| 8,467,770 B1* | 6/2013 | Ben Ayed | H04L 63/107 455/411 |
| 8,682,798 B2 | 3/2014 | Patterson | |
| 8,886,954 B1 | 11/2014 | Giobbi | |
| 9,271,110 B1* | 2/2016 | Fultz | H04W 4/029 |
| 9,355,299 B2 | 5/2016 | Hoyos et al. | |
| 9,594,954 B1 | 3/2017 | Walker et al. | |
| 9,606,647 B1 | 3/2017 | Spencer-Harper et al. | |
| 9,792,513 B2 | 10/2017 | Prodam et al. | |
| 9,798,942 B2 | 10/2017 | Prodam et al. | |
| 10,049,204 B2 | 8/2018 | Casals Andreu | |

(Continued)

*Primary Examiner* — Maung T Lwin
*Assistant Examiner* — Lizbeth Torres-Diaz
(74) *Attorney, Agent, or Firm* — Banner & Witcoff, Ltd.; Michael A. Springs

(57) ABSTRACT

Arrangements for automatically authenticating a user based on a signals-based footprint of the user are provided. In some examples, an authentication device may continuously scan a predefined area surrounding the authentication device. Upon detecting a user device, a determination may be made as to whether the device is detected for at least a threshold amount of time. If so, user data may be requested. In some examples, the user data may be requested from, for example, a mobile device of a user and may include biometric signature data, such as heart rate, respiratory rate, and the like. User response data may be received and compared to pre-stored data and, if the user response data meets or exceeds a threshold confidence level, the user may be automatically authenticated. If not, additional user authentication information, such as a username and password, personal identification number (PIN), or the like, may be requested to authenticate the user.

24 Claims, 12 Drawing Sheets

(56) References Cited

U.S. PATENT DOCUMENTS

| | | | |
|---|---|---|---|
| 10,602,339 B2 * | 3/2020 | Maheswaranathan | ......................... H04W 4/029 |
| 2004/0083394 A1 * | 4/2004 | Brebner | ............... G06Q 20/382 726/19 |
| 2015/0310444 A1 * | 10/2015 | Chen | .................. G06Q 20/3226 705/44 |
| 2018/0167812 A1 * | 6/2018 | Nagarajamoorthy | ......................... H04L 9/0861 |
| 2018/0192295 A1 * | 7/2018 | Mueck | .................. H04W 74/04 |
| 2018/0300692 A1 | 10/2018 | Kurian et al. | |
| 2020/0106771 A1 * | 4/2020 | Guibert | .................... G06F 21/32 |
| 2020/0186997 A1 * | 6/2020 | Smith | .................. G06Q 20/202 |
| 2020/0219349 A1 * | 7/2020 | Hodge | ................. G08B 25/001 |
| 2020/0334345 A1 * | 10/2020 | Young | ..................... G06F 21/32 |

\* cited by examiner

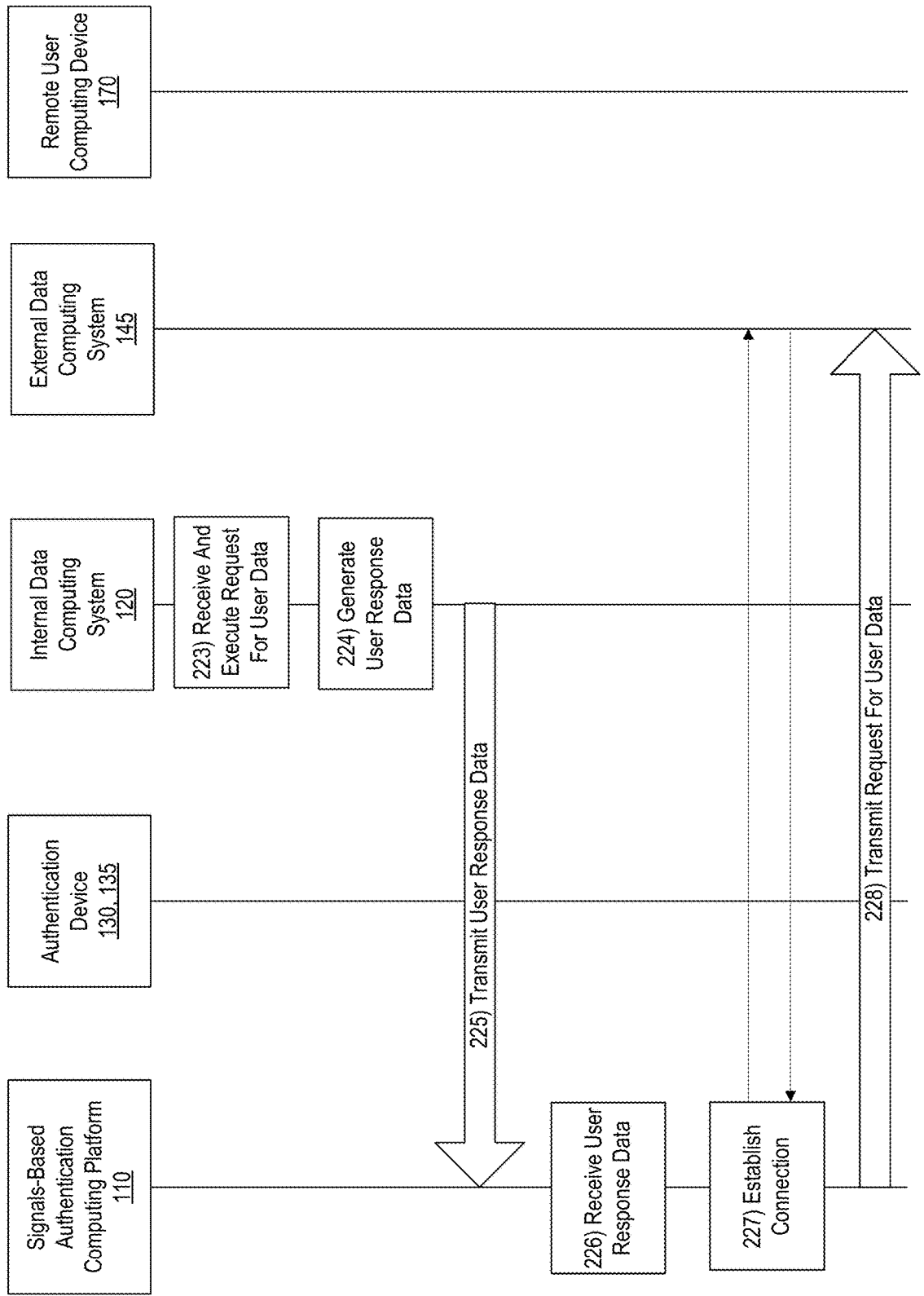

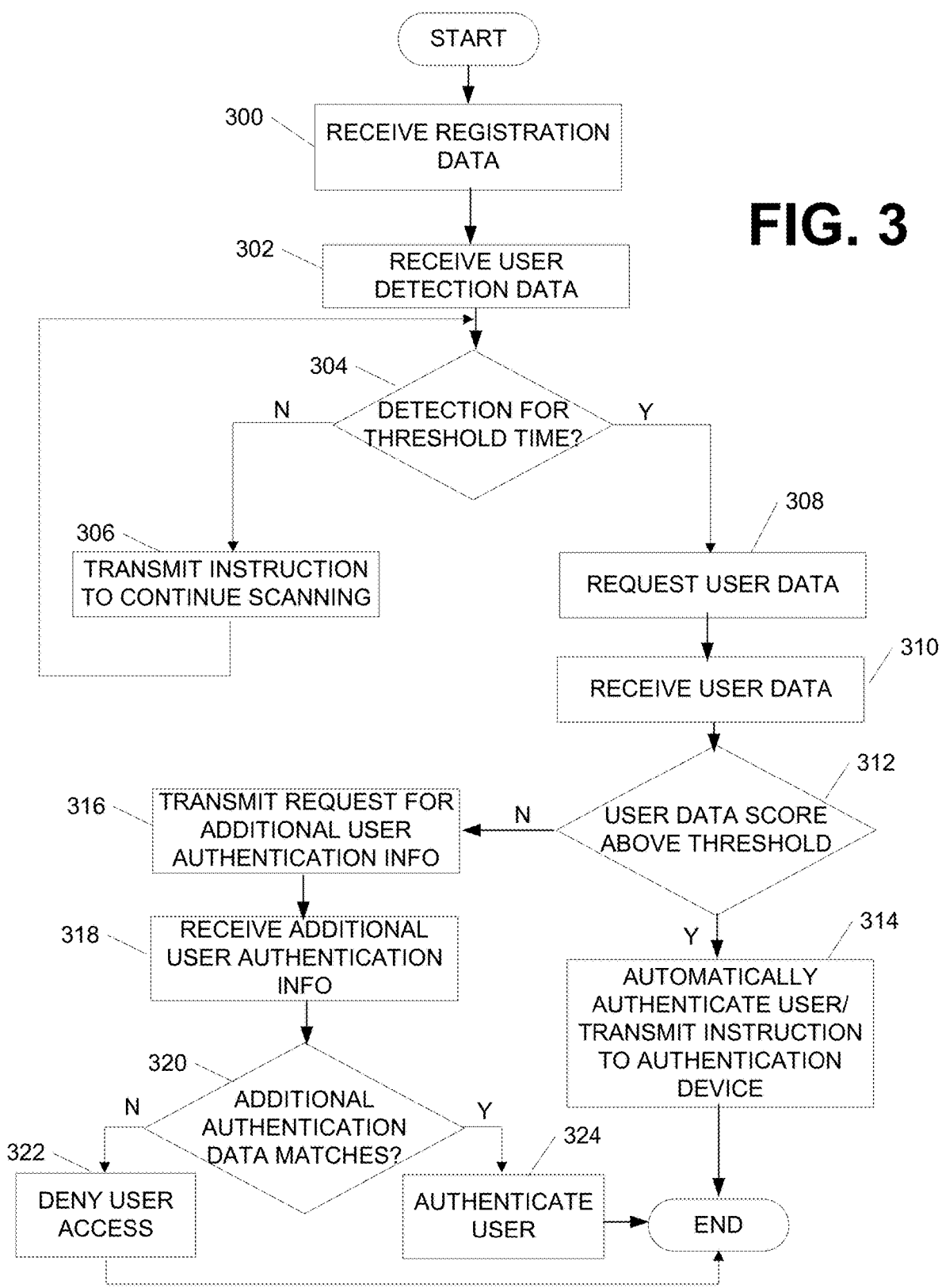

SIGNALS-BASED AUTHENTICATION

BACKGROUND

Aspects of the disclosure relate to electrical computers, systems, and devices for authentication and authorization. In particular, one or more aspects of the disclosure relate to automatically authenticating a user detected within a predefined proximity of an authentication device based on signals emitted from one or more devices.

Protecting user data, personal finances, and thwarting unauthorized activity are priorities for users today. As traditional methods of authentication become increasingly cumbersome, less reliable, and more prone to unauthorized access, technology is being used to generate new methods of authentication and event processing. Accordingly, it would be advantageous to provide authentication based on a user's signals-based footprint.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with authenticating users and/or authorizing event processing.

In some examples, an authentication device may continuously scan a predefined area surrounding the authentication device. Upon detecting a user device, a determination may be made as to whether the device is detected for at least a threshold amount of time. If so, user data may be requested. In some examples, the user data may be requested from, for example, a mobile device of a user and may include biometric signature data, such as heart rate, respiratory rate, and the like. User response data may be received and compared to pre-stored, baseline data (e.g., provided at a time of registration) and, if the user response data meets or exceeds a threshold confidence level, the user may be automatically authenticated (e.g., without requiring user input). If not, additional user authentication information, such as a username and password, personal identification number (PIN), or the like, may be requested to authenticate the user.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence for implementing signals-based authentication in accordance with one or more aspects described herein;

FIG. 3 depicts an illustrative method for implementing and using signals-based authentication according to one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to signals-based user authentication.

As mentioned above, protecting user data, user payment devices, and the like, is a top priority for many people. As traditional or conventional methods of authentication and authorization become less secure and more cumbersome, it is advantageous to use methods of authentication and authorization that are less susceptible to access by unauthorized users.

Accordingly, aspects described herein are directed to using a user's signals-based footprint to automatically authenticate a user. For instance, each user may have a signals-based, digital footprint generated via one or more user devices, biometric data, biometric signature data, and the like. This data may be leveraged to automatically authenticate a user based on the unique aspects of each user's footprint.

In some examples, a user device, such as a mobile device of a user (e.g., smartphone, wearable device, fitness tracker, or the like) may be detected within a predefined proximity of an authentication device. If the user device is detected for at least a predetermined amount of time, user data may be requested. The request for user data may be transmitted to one or more devices, including, at least the user device. In some examples, the request for user data may include a request for current biometric signature data.

User response data including the requested data may be generated and evaluated. In evaluating the user response data, a determination may be made as to whether a confidence level associated with the user response data is at least a threshold level. If so, the user may be automatically authenticated to the user device. If not, additional user authentication information may be requested.

These and various other arrangements will be discussed more fully below.

Figure 1A:
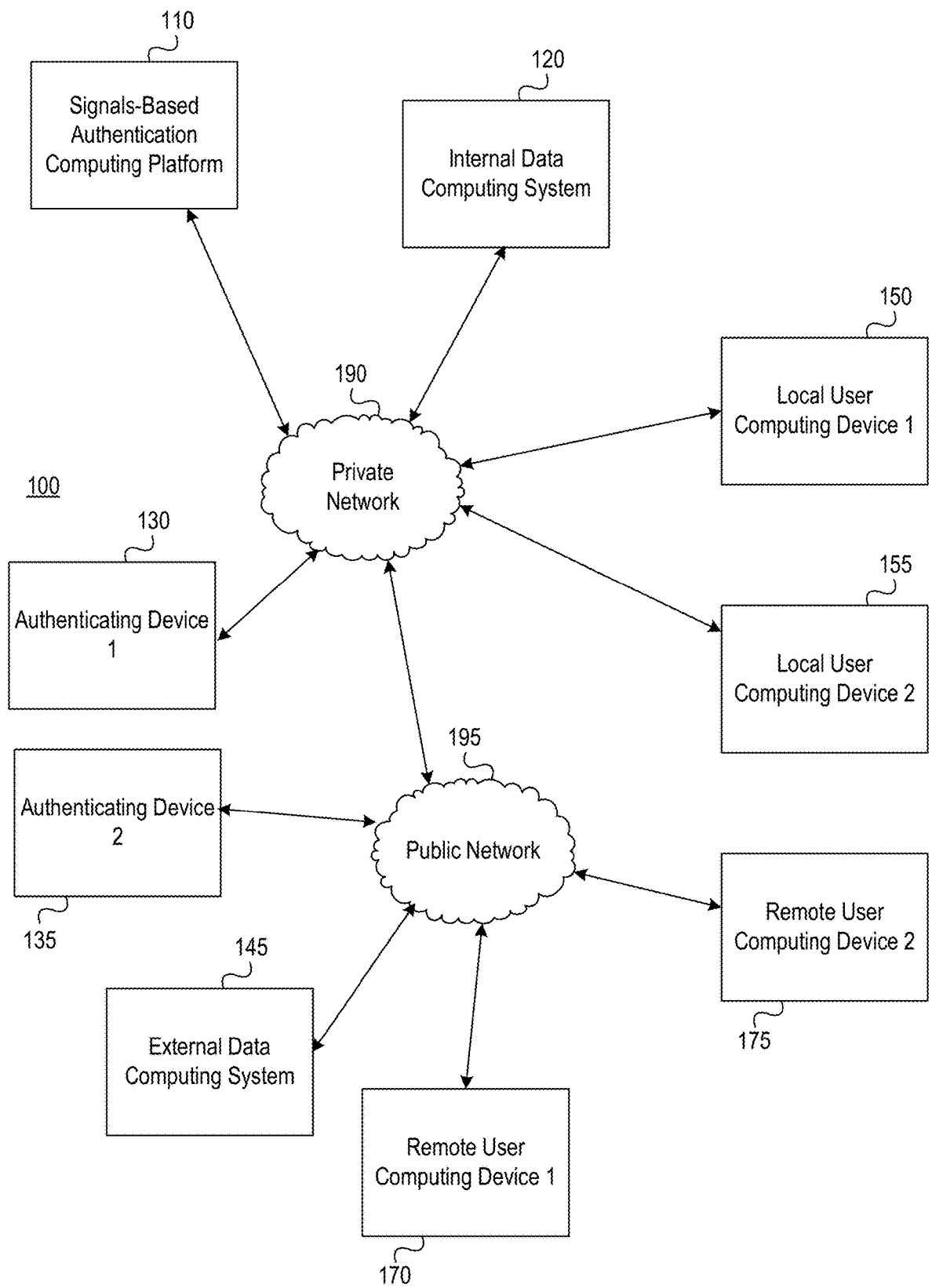
FIGS. 1A and 1B depict an illustrative computing environment for implementing signals-based authentication in accordance with one or more aspects described herein.
Figure 1B:
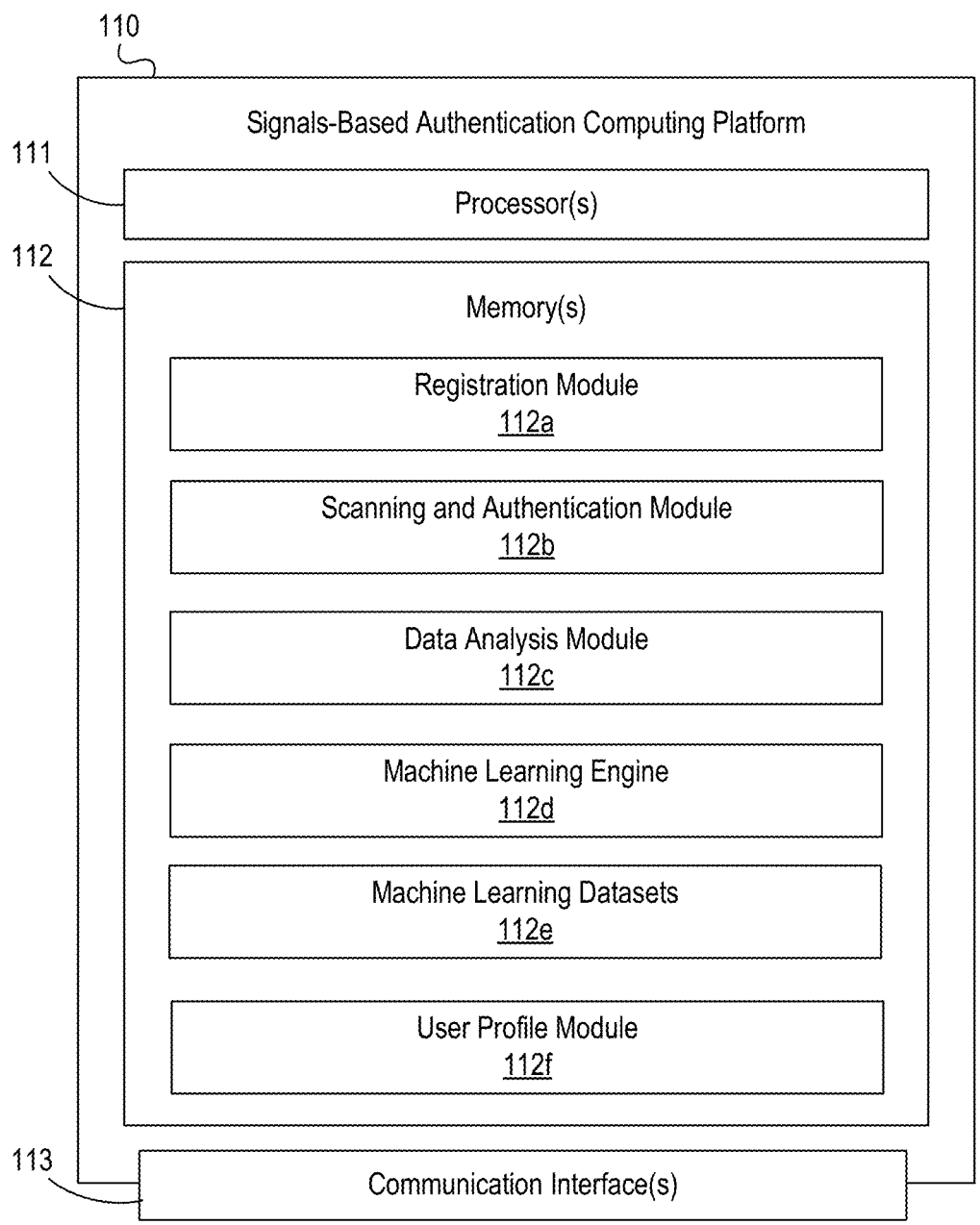

FIGS. 1A and 1B depict an illustrative computing environment for implementing and using a system for signals-based authentication in accordance with one or more aspects described herein. Referring to FIG. 1A, computing environment 100 may include one or more computing devices and/or other computing systems. For example, computing environment 100 may include signals-based authentication computing platform 110, internal data computing system 120, authentication device 130, authentication device 135, external data computing system 145, a first local user computing device 150, a second local user computing device 155, a first remote user computing device 170, and a second remote user computing device 175.

Signals-based authentication computing platform 110 may be configured to provide intelligent, dynamic authentication based on a plurality of signals received and processed, for example, in real-time. For instance, a user may approach a device, such as authentication device 130 or authentication device 135. In some examples, the authentication device may be an automated teller machine (ATM) or other self-service kiosk, an access device controlling access to a building or other secure area, a point-of-sale system, or the like. As the user approaches the device, the device may detect a presence of the user. For instance, the device may continuously scan for signals (such as radio frequency (RF) or other signals) emitted from one or more user devices, such as a mobile device of a user (e.g., remote user computing device 170, remote user computing device 170, or the like), a wearable device of a user (e.g., remote user computing device 170, remote user computing device 175, or the like), an RFID tag of the user, and the like. In some examples, the user device(s) may emit a signal in response to detection of the continuous scan of the device.

Upon detecting the user device, the device or associated system may capture user data, such as a current heart rate or respiratory rate. The captured data may be compared to pre-stored data captured, for example, during a registration process of the user and with permission of the user. Additionally or alternatively, other user data may be captured and evaluated. For instance, a location of the user (e.g., based on global positioning system (GPS) data from a user device), time of day, pattern of behavior, expected location (e.g., based on calendar or other data), or the like, may be captured and evaluated to determine whether it matches pre-stored or predicted (e.g., based on machine learning) data. Based on the results of the comparing the captured data to pre-stored or predicted data, the user may be authenticated. In some examples, the user may be authenticated without any additional user input (e.g., solely based on data captured without input of the user).

In some arrangements, data may be captured after a user is detected for a predetermined or threshold time period. For instance, a user walking by a scanning device (e.g., an ATM or the like) might be detected but no data may be captured if the user is not detected within an area surrounding the device for a predetermined or threshold time period. Alternatively, if a user is detected within the area surrounding the device for a predetermined or threshold time period (e.g., has stopped in front of, for example, the ATM or the like), user data may be captured and analyzed. Accordingly, data associated with all detected users might not be captured and analyzed.

Accordingly, the arrangements described herein provide for a user to be passively authenticated based on a plurality of data points which may increase confidence in authenticating the user. In some examples, each of the plurality of data points may be scored and a score may be summed to determine an overall score. The overall score may be compared to a confidence threshold. If the overall score meets or exceeds the confidence threshold, the user may be passively authenticated (e.g., without additional user input). If the overall score is below the threshold, additional authentication information (e.g., via user input) may be required before authenticating the user.

Computing environment 100 also may include one or more authentication devices, such as authentication device 130 and authentication device 135. The authentication devices 130, 135 may be devices to which a user would like to be authenticated in order to access an area, process an event, or the like. For instance, as discussed above, the authentication device 130, 135 may be or include an ATM or other self-service kiosk, access system for a building or other secure area, point-of-sale system for processing one or more transactions or events, and the like. The authentication device 130, 135 may continuously or periodically scan for devices or device signals (such as RF signals) to identify a presence of a device and associated user in order to begin an authentication process. In some examples, signals-based authentication computing platform 110 may be housed within or be part of an authentication device 130, 135 and/or one or more functions described herein with respect to the signals-based authentication computing platform 110 may be performed by the authentication device 130, 135. In other examples, the signals-based authentication computing platform 110 may be a physically separate device in communication with the authentication device 130, 135.

In some examples, one or more authentication devices may be internal to the entity implementing the signals-based authentication computing platform 110. For instance, authentication device 130 may be implemented by the same entity implementing the signals-based authentication computing platform 110. Accordingly, authentication device 130 may be, for example, an ATM or other self-service kiosk. In these arrangements, the authentication device 130 may communicate with signals-based authentication computing platform 110 or other devices via private network 190.

In some arrangements, one or more authentication devices may be external to the entity implementing the signals-based authentication computing platform 110. For instance, authentication device 135 may be implemented by a different entity than the entity implementing the signals-based authentication computing platform 110. Accordingly, authentication device 130 may include, for example, an access system controlling access to a building or secure location, a point-of-sale system at a retailer, or the like. In these examples, authentication device 135 may communicate with signals-based authentication computing platform 110 or other devices via public network 195.

Although two authentication devices are shown in FIG. 1A, more or fewer authentication devices may be used without departing from the invention. Further, in some examples, one or more authentication devices 130, 135 may communicate with signals-based authentication computing platform 110 via either or both private network 190 and public network 195.

Computing environment 100 may also include one or more internal data computing systems 120. Internal data computing system 120 may store data associated with customers of an entity implementing the signals-based authentication computing platform 110. For instance, internal data computing system 120 may store data associated with customer identification information, account information, historical data (e.g., event processing data, purchase history data, and the like). In some examples, this data may be used to predict or determine whether a user should be authenticated to a device, such as authentication device 130, authentication device 135, or the like.

Computing environment 100 may further include one or more external data computing systems 145. External data computing system 145 may store data from sources external to the entity implementing the signals-based authentication computing platform 110. For instance, external data computing system 145 may store data associated with purchase history of the user (e.g., purchases made via an entity other than the entity implementing the signals-based authentication computing platform 110), internet browsing history, radio frequency identification (RFID) tag data, and the like. The data extracted and/or processed from the external data computing system 145 may be captured, extracted and/or processed with permission of the user.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access one or more entity systems, functions or processes. In some examples, local user computing device 150, 155 may be used to access the signals-based authentication computing platform 110 to control parameters of the system, update or execute rules, modify settings, display notifications, and the like.

The remote user computing devices 170, 175 may be used to communicate with, for example, signals-based authentication computing platform 110, authentication device 130, authentication device 135, and the like. For instance, remote user computing devices 170, 175 may include user computing devices, such as mobile devices including smartphones, tablets, laptop computers, wearable devices, fitness trackers, and the like, that may be used to authenticate a user, communicate with signals-based authentication computing platform 110, receive or transmit signals for detection, store and transmit user data (e.g., location data (GPS data), calendar data, time data, and the like), and the like.

In one or more arrangements, internal data computing system 120, external data computing system 145, local user computing device 150, local user computing device 155, remote user computing device 170, and/or remote user computing device 175 may be any type of computing device or combination of devices configured to perform the particular functions described herein. For example, internal data computing system 120, external data computing system 145, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of internal data computing system 120, external data computing system 145, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include signals-based authentication computing platform 110. As illustrated in greater detail below, signals-based authentication computing platform 110 may include one or more computing devices configured to perform one or more of the functions described herein. For example, signals-based authentication computing platform 110 may include one or more computers (e.g., laptop computers, desktop computers, servers, server blades, or the like).

As mentioned above, computing environment 100 also may include one or more networks, which may interconnect one or more of signals-based authentication computing platform 110, internal data computing system 120, authentication device 130, authentication device 135, external data computing system 145, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, signals-based authentication computing platform 110, authentication device 130, internal data computing system 120, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect signals-based authentication computing platform 110, authentication device 130, internal data computing system 120, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., signals-based authentication computing platform 110, authentication device 130, internal data computing system 120, local user computing device 150, local user computing device 155) with one or more networks and/or computing devices that are not associated with the organization. For example, authentication device 135, external data computing system 145, remote user computing device 170, remote user computing device 175, might not be associated with an organization that operates private network 190 (e.g., because authentication device 135, external data computing system 145, remote user computing device 170, remote user computing device 175, may be owned, operated, and/or serviced by one or more entities different from the organization that operates private network 190, such as a second entity different from the entity, one or more customers of the organization, public or government entities, and/or vendors of the organization, rather than being owned and/or operated by the organization itself or an employee or affiliate of the organization), and public network 195 may include one or more networks (e.g., the internet) that connect authentication device 135, external data computing system 145, remote user computing device 170, remote user computing device 175, to private network 190 and/or one or more computing devices connected thereto (e.g., signals-based authentication computing platform 110, authentication device 130, internal data computing system 120, local user computing device 150, local user computing device 155).

Referring to FIG. 1B, signals-based authentication computing platform 110 may include one or more processors 111, memory 112, and communication interface 113. A data bus may interconnect processor(s) 111, memory 112, and communication interface 113. Communication interface 113 may be a network interface configured to support communication between signals-based authentication computing platform 110 and one or more networks (e.g., private network 190, public network 195, or the like). Memory 112 may include one or more program modules having instructions that when executed by processor(s) 111 cause signals-based authentication computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of signals-based authentication computing platform 110 and/or by different computing devices that may form and/or otherwise make up signals-based authentication computing platform 110.

For example, memory 112 may have, store and/or include a registration module 112a. Registration module 112a may store instructions and/or data that may cause or enable the signals-based authentication computing platform 110 to receive registration information from one or more users. For instance, a user may be a customer of an entity implementing the signals-based authentication computing platform 110 (e.g., a financial institution, government entity, corporation, or the like). The user may provide registration information, such as name, contact information, pre-stored authentication information such as username, password, personal identification number (PIN), account information, payment card information, and the like. In some examples, the registration information may include biometric data, such as a fingerprint, voiceprint, iris scan, or the like. Additionally or alternatively, the registration information may include biometric signature data, such as a heart rate of the user (e.g., resting or otherwise), walking gait, respiratory rate, and the like. The biometric signature data may be captured via one or more sensors on a mobile device of the user, via one or more devices used by the entity to obtain registration information, and the like. Registration information may further include information associated with one or more user devices (e.g., IMEI, signal or frequency of signal, or the like). In some examples, registration information may include permission for the entity to obtain various user data, process data, generate outputs, and the like.

Additional types of data may be obtained via the registration process without departing from the invention.

The registration information may be received by the registration module 112a and a registration record may be generated for the user. The registration record may be generated in a data structure and adding the record may modify the data structure. The user registration information may then be stored (e.g., pre-stored in advance of using information for authentication) and may be used to authenticate the user according to one or more aspects described herein.

In some arrangements, receiving the registration information may cause the signals-based authentication computing platform 110 to transmit an application to the mobile device of the user (e.g., remote user computing device 170, remote user computing device 175, or the like) and cause the application to execute on the mobile device. In some examples, executing the application may cause the application to run in a background on the mobile device, cause the mobile device or detect one or more signals, facilitate transmission of user data for evaluation, and the like.

Signals-based authentication computing platform 110 may further have, store and/or include a scanning and authentication module 112b. Scanning and authentication module 112b may store instructions and/or data that may cause or enable the signals-based authentication computing platform 110 to transmit and instruction or command to one or more device (e.g., authentication device 130, authentication device 135, and the like) to continuously scan for mobile devices (e.g., of registered users). Further, scanning and authentication module 112b may receive an indication of a detected device of a user (e.g., remote user computing device 170, remote user computing device 175) from the device (e.g., authentication device 130, authentication device 135), determine whether the device is detected for at least a pre-determined amount of time, extract user data (e.g., biometric signal data, historical data, and the like), compare the extracted user data to pre-stored data and, if a match exists (e.g., with at least a predetermined level of confidence) authenticate a user.

In some examples, the authentication devices performing continuous scanning to detect signals such as radio frequency (RF) signals, Bluetooth, or other low energy signals emitted from or detected from a user device, such as remote user computing device 170, remote user computing device 175, or the like.

In some examples, upon detecting the user device, current biometric signature data may be captured, e.g., via one or more sensors in the user device. For example, heart rate sensors, respiration rate sensors, pulse sensors, and the like, may be used to capture current user biometric signature data. In some examples, the application provided by the signals-based authentication computing platform 110 and executing on the user device may activate one or more sensors in response to detection of the user, facilitate capture and transmission of sensor data, and the like.

Signals-based authentication computing platform 110 may further have, store and/or include data analysis module 112c. Data analysis module 112c may store instructions and/or data that may cause or enable the signals-based authentication computing platform 110 to receive data from one or more sources, such as internal data computing system 120, external data computing system 145, and the like, and analyze data associated with one or more users. For instance, data associated with historical purchases, purchase behaviors, patterns of location data (e.g., based on GPS phone data), and the like, may be extracted and analyzed to aid in predicted whether a user should be authenticated. In some examples, the data may be extracted and analyzed in real-time (e.g., upon detection of a user at a device for a predetermined time period) and/or may be extracted and analyzed in advance to generate one or more expected behaviors, patterns, or the like.

For instance, the extracted data may be processed using machine learning to predict whether a user should be authenticated or whether additional authentication information should be requested. Accordingly, signals-based authentication computing platform 110 may have, store and/or include a machine learning engine 112d and machine learning datasets 112e. Machine learning engine 112d and machine learning datasets 112e may store instructions and/or data that may cause or enable signals-based authentication computing platform 110 to further process data from, for example, data analysis module 112c, one or more data sources (e.g., internal data computing system 120, external data computing system 145), and the like, to identify one or more patterns or user behaviors in order to predict whether to authenticate a user or request additional (e.g., more traditional) authentication information. For instance, based on user historical data, location data from the user's mobile device, and the like, the machine learning engine 112d may generate predictions associated with whether the user should be authenticated (e.g., without user input or information) or whether additional authentication information (e.g., username, password, PIN, or the like) should be requested. The machine learning datasets 112e may be generated based on analyzed data (e.g., data from previously received data, behavioral data, purchase data, and the like), raw data, and/or received from one or more outside sources.

The machine learning engine 112d may receive data related to one or more users and, using one or more machine learning algorithms, may generate one or more machine learning datasets 112e. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112d may analyze data to identify patterns of activity, sequences of activity, and the like, to generate one or more machine learning datasets 112e.

In some examples, the machine learning datasets 112e may include machine learning data linking one or more patterns of a user to one or more processed trusted events (e.g., location and/or purchase history data may be used to identify shopping patterns for a user, location and time at a particular location in a pattern over a period of time may be used to identify frequent or regular visits to the same ATM location, calendar information may be used to predict location of a user compared to actual location data to provide access to a secure area, and the like) and this information may be used to automatically (e.g., without additional user input or interaction) authenticate the user. If the data being analyzed does not match a pattern or predicted behavior, additional authentication data may be requested (e.g., a request for user input including authentication information).

Signals-based authentication computing platform 110 may further have, store and/or include user profile module 112f. User profile module 112f may store instructions and/or data that may cause or enable the signals-based computing platform 110 to generate, store, update, or the like, a user profile. In some examples, the user profile may store user patterns (e.g., time, day and location of requested authentication, or the like). The user profile may further include user information, account information, and the like. In some examples, data provided during registration (e.g., biometric data, biometric signature data, and the like) may be stored in a user profile in the user profile module 112f (e.g., the data record generated may be stored in a data structure in the user profile module 112f).

FIGS. 2A-2G depict one example illustrative event sequence for implementing and using signals-based authentication in accordance with one or more aspects described herein. The events shown in the illustrative event sequence are merely one example sequence and additional events may be added, or events may be omitted, without departing from the invention.

Figure 2A:
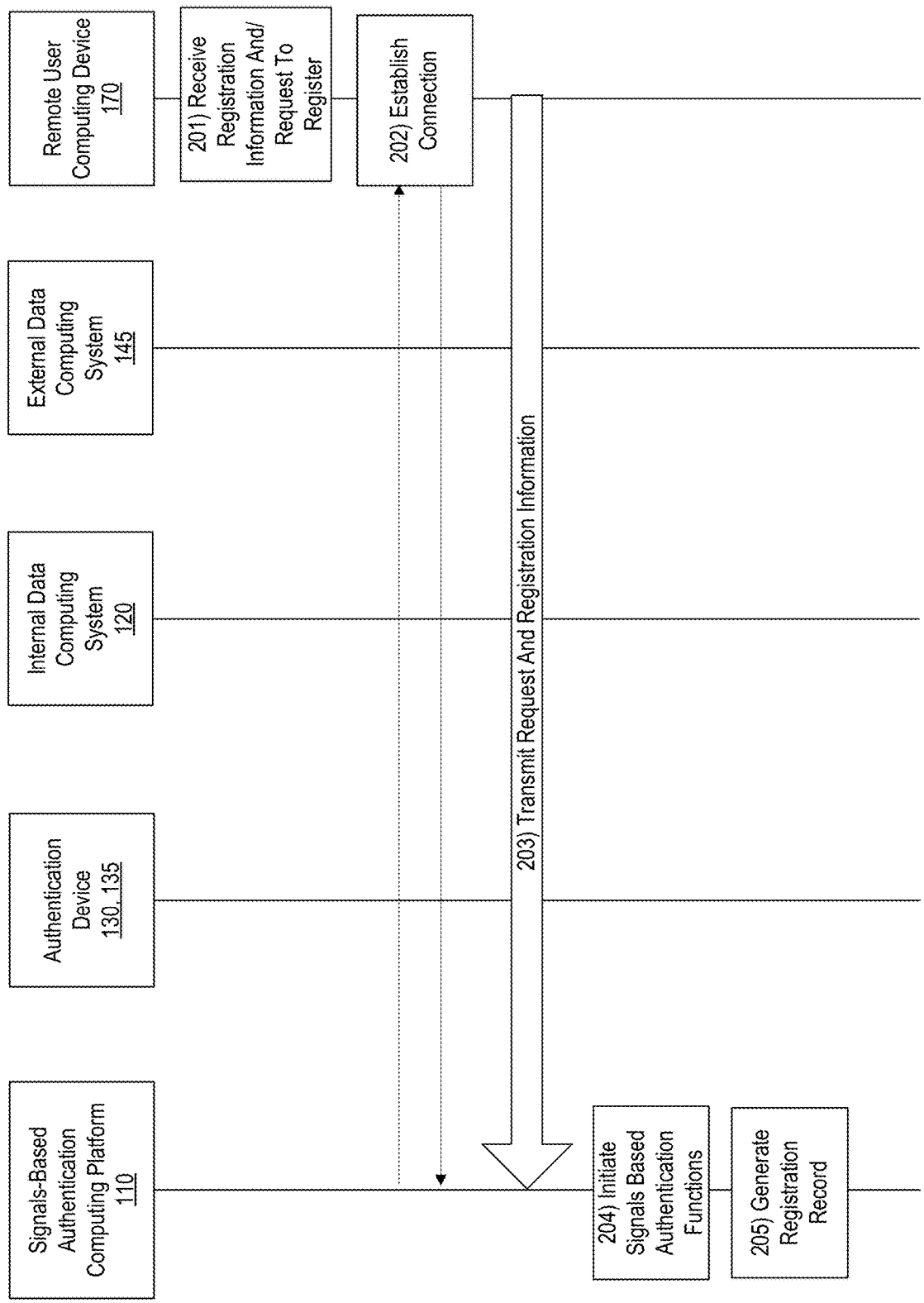

Referring to FIG. 2A, at step 201, registration information and/or a request to register with a system may be received. For instance, a user may input a request for registration into a mobile device, such as remote user computing device 170.

In some examples, the request for registration and/or registration information may include information associated with a user, such as user identifying information (e.g., name, birthdate, contact information), user authentication information (e.g., one or more pieces of authenticating information such as usernames and passwords, personal identification number (PIN), biometric data, and the like), account or other form of payment information (e.g., account numbers, card numbers, expiration dates, routing numbers, and the like), user device information, and the like. In some examples, the registration information may include user permission information for retrieving data, storing data, processing data, and the like.

In at least some arrangements, the user registration information may include biometric signature data, such as a heart rate (e.g., resting or other), respiratory rate, and the like. In some examples, this data may be captured via one or more sensors on remote user computing device 170, via one or more devices provided by an entity implementing signals-based authentication computing platform 110, or the like. In some arrangements, the data captured may be a single data point (e.g., heart rate at one given time, or the like), while in other examples, one or more biometric signature items may be captured at multiple points in time (e.g., heart rate at multiple different times/days, or the like). The biometric signature information may be stored and updated to include later captured data, as will be discussed more fully herein.

At step 202, a connection may be established between the remote user computing device 170 and the signals-based authentication computing platform 110. For instance, a first wireless connection may be established between the remote user computing device 170 and the signals-based authentication computing platform 110. Upon establishing the first wireless connection, a communication session may be initiated between the remote user computing device 170 and the signals-based authentication computing platform 110.

At step 203, the request for registration and/or registration information may be transmitted to the signals-based authentication computing platform 110. For instance, the request for registration and/or registration information may be transmitted during the communication session established upon initiating the first wireless connection.

At step 204, the request for registration and/or registration information may be received by the signals-based authentication computing platform 110 and processed. Processing the received information may include initiating, activating and/or enabling one or more signals-based authentication functions. For instance, features that were previously disabled or inactive may be activated or enabled responsive to receiving the request for registration and/or registration information.

At step 205, a registration record may be generated. For instance, a data structure may be modified to include a new data element associated with the received registration request and/or registration information. The data element may include the received registration information (e.g., user information, payment information, biometric data, biometric signature data, pre-stored authentication data, and the like).

Figure 2B:
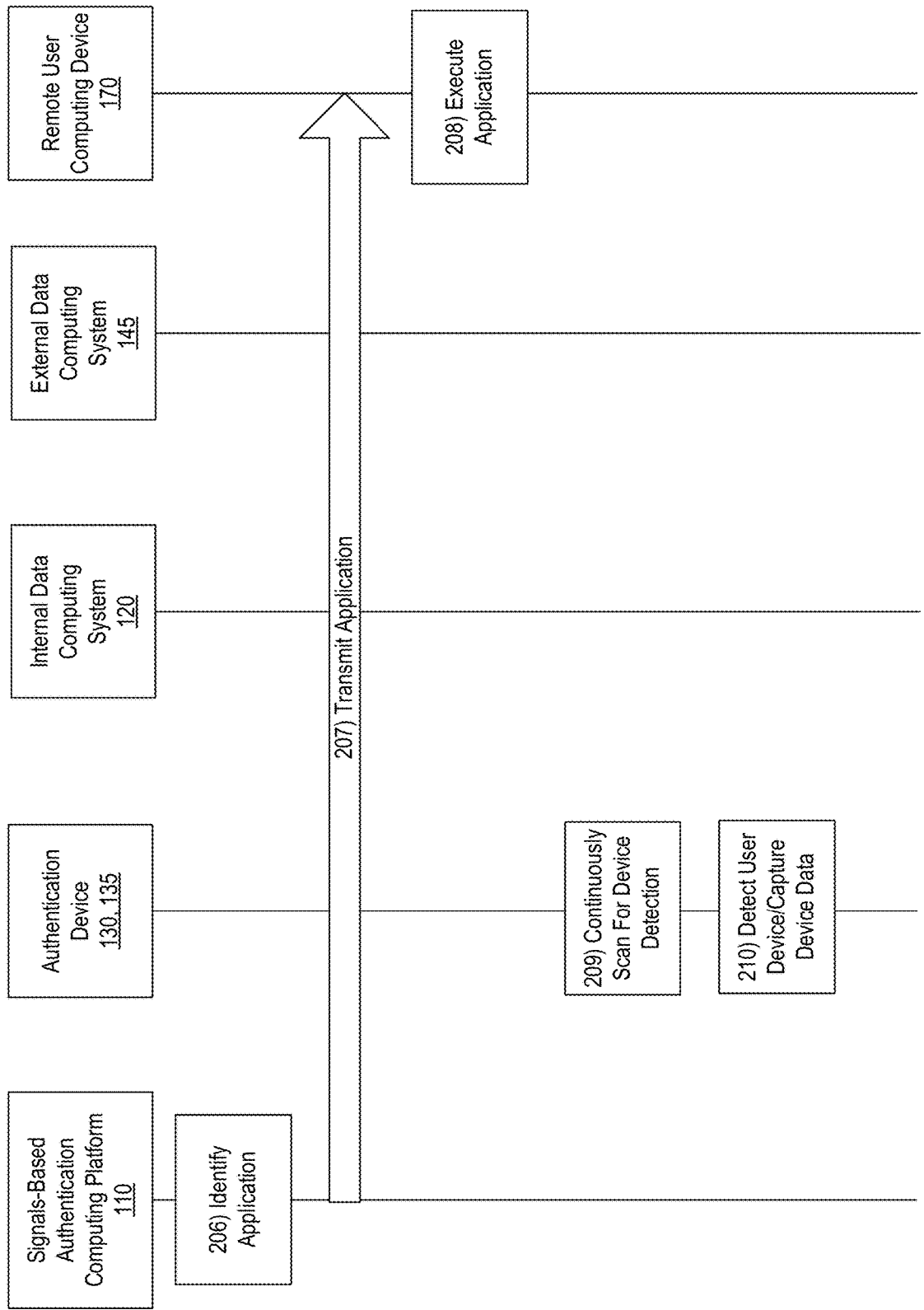

With reference to FIG. 2B, at step 206, an application may be identified by the signals-based authentication computing platform 110. The application may be an application to execute on the mobile device of the user (e.g., remote user computing device 170) to detect or emit signals, respond to signals emitted, capture data, activate or enable sensors, transmit data, process data, generate and display user interfaces, and the like.

At step 207, the identified application may be transmitted to the remote user computing device 170. In some examples, the application may be transmitted during the communication session initiated upon establishing the first wireless connection.

At step 208, the application may be received by the remote user computing device 170 and executed by the remote user computing device 170.

At step 209, one or more authentication devices 130, 135 may continuously scan for a user device, such as remote user computing device 170. In some examples, continuously scanning may include emitting a signal for detection by the remote user computing device 170 which may then transmit a signal in response. In other examples, continuously scanning may include scanning for available Bluetooth or other signals that may be emitted from the remote user computing device 170, or the like. In at least some examples, the authentication device 130, 135 may continuously scan to detect devices registered with the signals-based authentication computing platform 110.

In some arrangements, continuously scanning may include continuously scanning for user devices within a predefined distance of the authentication device 130, 135. For instance, the authentication device 130, 135 may scan for devices within a predetermined linear distance (e.g., 1 foot, 3 feet, 5 feet, 2 meters, or the like) or radius (e.g., 1 foot, 2 meters, 5 feet, or the like) of the authentication device 130, 135. Accordingly, only user devices within the predefined proximity of the device may be detected, which may reduce processing resources to evaluate detected device data, and the like.

At step 210, a user device, such as remote user computing device 170 may be detected and device data may be captured. For instance, device data such as a period of time for which the device is detected (e.g., is within range of the authentication device 130, 135) may be captured (e.g., a count may begin upon initial detection of the device and may end when the remote user computing device 170 is no longer detected or upon reaching a predetermined threshold count, such as 3 seconds, 5 seconds, 10 seconds, 30 seconds, one minute, or the like. In some examples, detection of a first device may cause the authentication device 130, 135 to continue scanning for additional devices (e.g., RF signals emitted from other user devices, such as remote user computing device 175) that are associated with a user. For instance, if a smartphone of a user is detected, the authentication device 130, 135 may continue scanning for signals from other devices, such as a smart watch, fitness tracker, or the like.

Figure 2C:
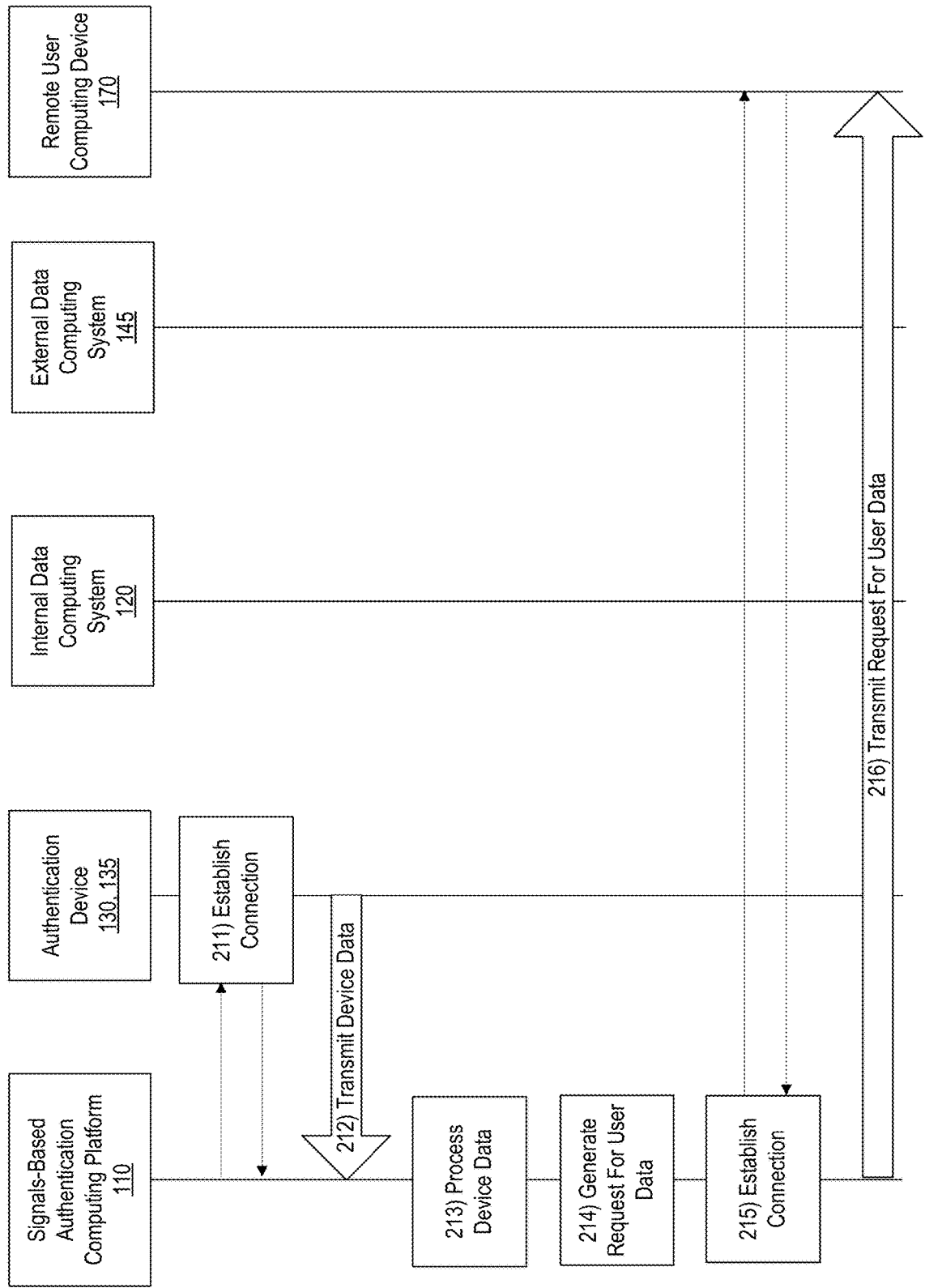

With reference to FIG. 2C, at step 211, a connection may be established between the authentication device 130, 135 and the signals-based authentication computing platform 110. For instance, a second wireless connection may be established between the authentication device 130, 135 and the signals-based authentication computing platform 110. Upon establishing the second wireless connection, a communication session may be initiated between the authentication device 130, 135 and the signals-based authentication computing platform 110.

At step 212, the captured device data may be transmitted to the signals-based authentication computing platform 110. For instance, the device data associated with detection of the device, an amount of time the device was within a predefined range of the authentication device, and the like, may be transmitted during the communication session established upon initiating the second wireless connection.

At step 213, the device data may be processed. For instance, identifying information associated with the device may be compared to pre-stored device identifying information (e.g., received during the registration process) to confirm that the detected device is a registered device. Additionally or alternatively, the device data may be processed and analyzed to determine whether the device was detected within the predefined proximity of the authentication device for at least a predetermined period of time. For example, the time of device detection may be compared to a threshold. If the time matches or exceeds the threshold, the signals-based authentication computing platform 110 may determine that the user is attempting to engage with the authentication device 130, 135 and/or desires to be authenticated. If not, the signals-based authentication computing platform 110 may determine that the user was passing by the authentication device 130, 135 and no further action to authenticate the user may be taken.

If the device was detected for at least the threshold amount of time, at step 214, a request for user data may be generated. For instance, the signals-based authentication computing platform 110 may generate a request for one or more types of authentication information associated with the user and, in some examples, that does not require input from the user. For instance, the signals-based authentication computing platform 110 may generate a request for biometric signature data (e.g., heart rate, respiratory rate, and the like) that may be captured by the remote user computing device 170, or by another device associated with the user (e.g., remote user computing device 175) that may be, for example, a fitness tracker or other wearable device. Additionally or alternatively, the signals-based authentication computing platform 110 may generate a request for additional user data, such as purchase history, behavior data, publicly available data, and the like. In some examples, the signals-based authentication computing platform 110 may request data related to detection of any additional RF signals from the authentication device 130, 135.

At step 215, a connection may be established between the remote user computing device 170 and the signals-based authentication computing platform 110. For instance, a third wireless connection may be established between the remote user computing device 170 and the signals-based authentication computing platform 110. Upon establishing the third wireless connection, a communication session may be initiated between the remote user computing device 170 and the signals-based authentication computing platform 110. In some examples, the third wireless connection may be established after termination of the first wireless connection (e.g., after a registration process is completed).

At step 216, the request for user data may be transmitted to the remote user computing device 170 (or other remote user computing device). For instance, the request for user data may be transmitted during the communication session established upon initiating the third wireless connection.

Figure 2D:
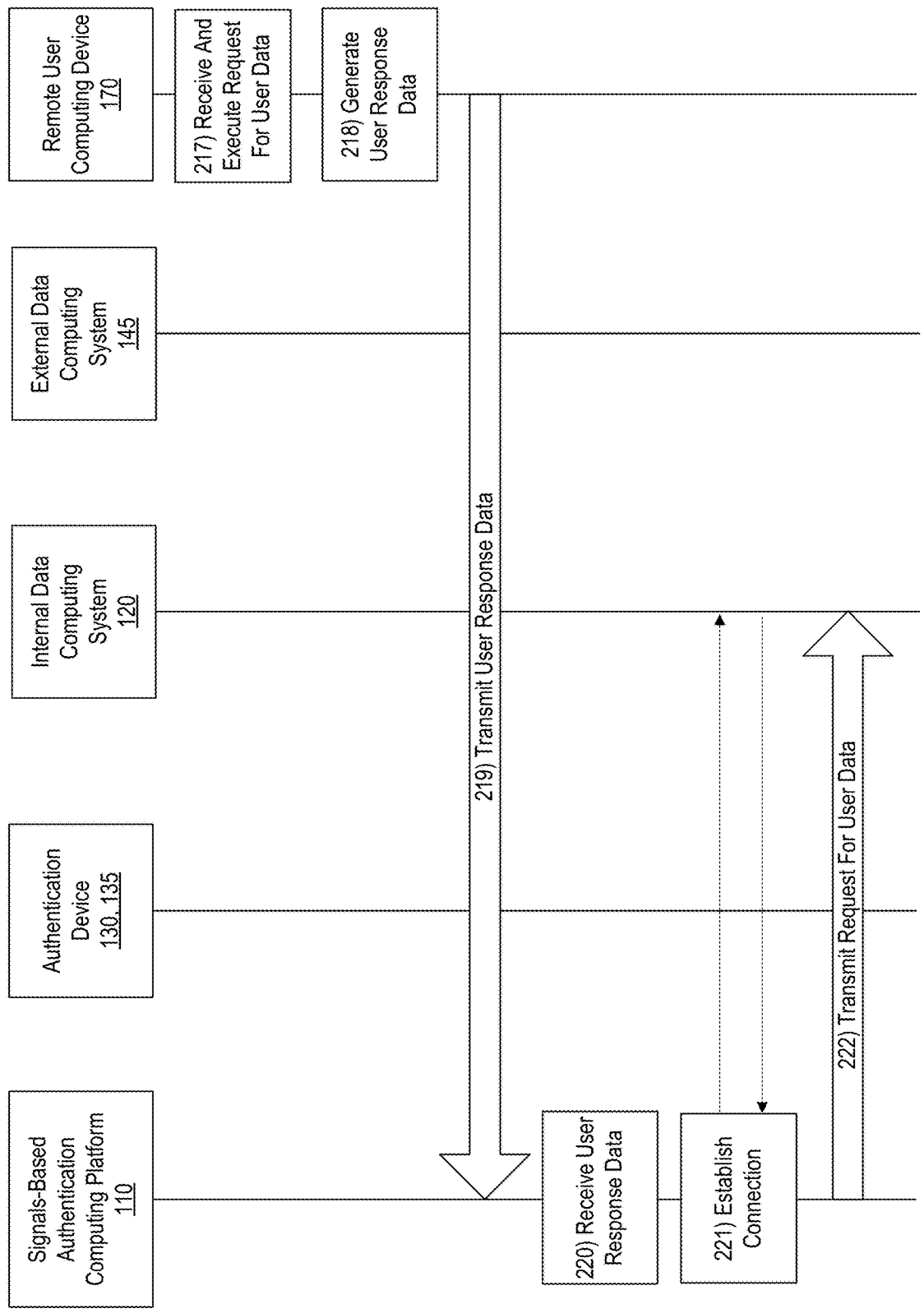

With reference to FIG. 2D, at step 217, the request for user data may be received by the remote user computing device 170 and executed. For instance, current user biometric signature data may be captured, current location data may be captured, and the like. The captured data may be used to generate user response data at step 218. At step 219, the user response data may be transmitted from the remote user computing device 170 to the signals-based authentication computing platform 110.

At step 220, the user response data may be received from the remote user computing device 170.

At step 221, a connection may be established between the signals-based authentication computing platform 110 and the internal data computing system 120. For instance, a fourth wireless connection may be established between the signals-based authentication computing platform 110 and the internal data computing system 120. Upon establishing the fourth wireless connection, a communication session may be initiated between the signals-based authentication computing platform 110 and the internal data computing system 120.

At step 222, the request for user data may be transmitted to the internal data computing system 120. For instance, the request for user data may be transmitted during the communication session established upon initiating the fourth wireless connection and may include requests for purchase history, location and associated time stamp data, and the like.

With reference to FIG. 2E, at step 223, the request for user data may be received by the internal data computing system 120 and executed to identify and extract the requested data. At step 224, user response data may be generated based on the extracted data. At step 225, the user response data may be transmitted from the internal data computing system 120 to the signals-based authentication computing platform 110. At step 226, the signals-based authentication computing platform 110 may receive the user response data from the internal data computing system 120.

At step 227, a connection may be established between the signals-based authentication computing platform 110 and the external data computing system 145. For instance, a fifth wireless connection may be established between the signals-based authentication computing platform 110 and the external data computing system 145. Upon establishing the fifth wireless connection, a communication session may be initiated between the signals-based authentication computing platform 110 and the external data computing system 145.

At step 228, the request for user data may be transmitted to the external data computing system 145. For instance, the request for user data may be transmitted during the communication session established upon initiating the fifth wireless connection and may include requests for purchase history, patterns of usage, and the like.

Figure 2F:
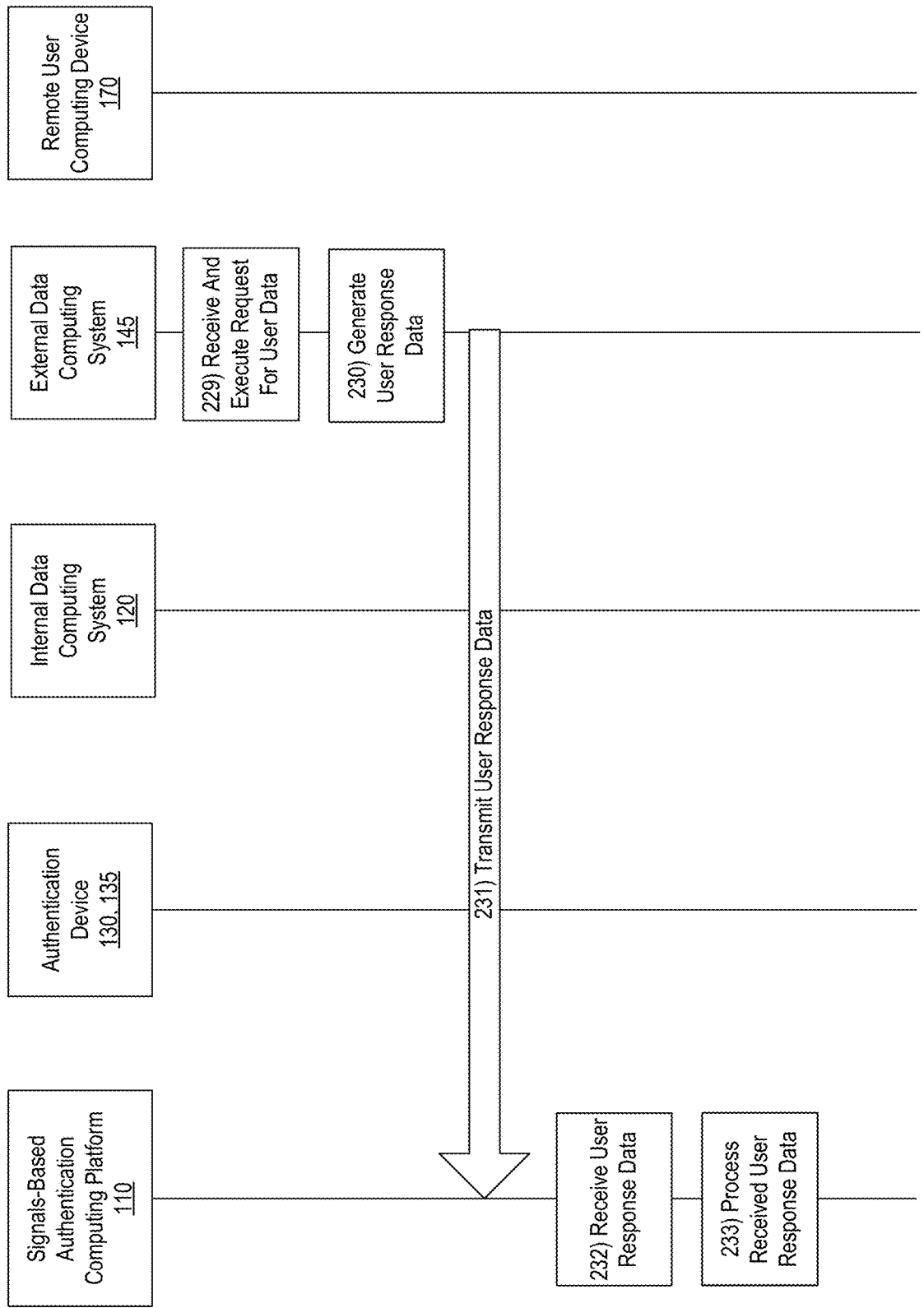

With reference to FIG. 2F, at step 229, the request for user data may be received by the external data computing system 145 and executed to identify and extract the requested data. At step 230, the extracted data may be used to generate user response data. At step 231, the user response data may be transmitted from the external data computing system 145 to the signals-based authentication computing platform 110.

At step 232, the user response data may be received by the signals-based authentication computing platform 110.

At step 233, the user response data received from the remote user computing device 170, internal data computing system 120 and/or external data computing system 145 may be processed to evaluate the user for authentication. In some examples, machine learning may be used to predict whether the user should be authenticated. For instance, one or more machine learning datasets may be used to evaluate data of the user (e.g., biometric signature data, location data, time stamp data, and the like) to identify known or expected patterns or behaviors of the user which may then be used to authenticate the user automatically.

Additionally or alternatively, in some examples, data from one or more of the remote user computing device 170, internal data computing system 120, and/or external data computing system 145 may be evaluated and scored to determine a confidence score in the data (e.g., how likely the data received is accurate or accurately represents the user). The sum of the data confidence scores may be compared to a predetermined threshold to determine whether the user should be automatically authenticated or whether additional authentication information should be requested from the user (e.g., whether the user should provide user input for authentication).

Figure 2G:
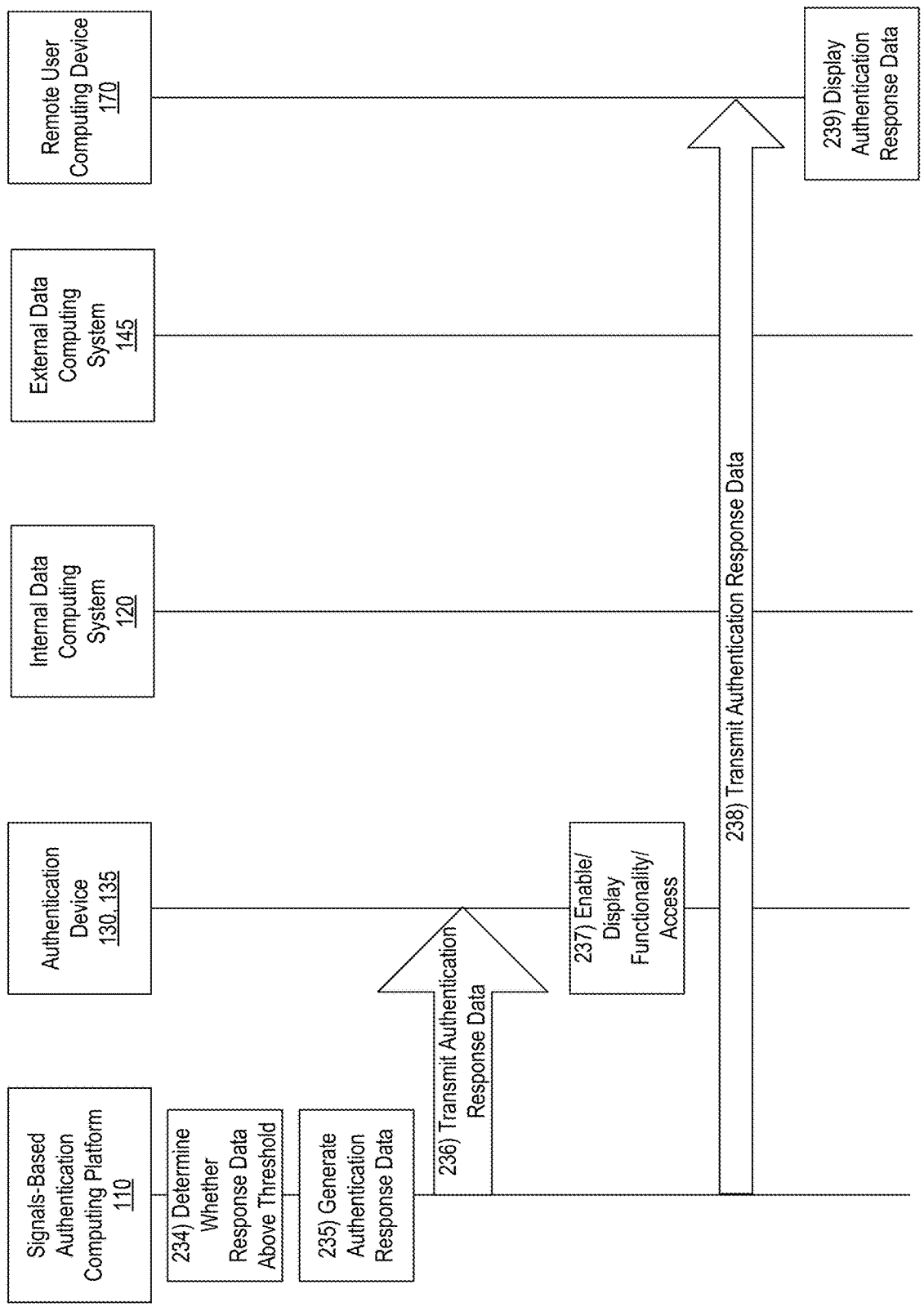

With reference to FIG. 2G, at step 234, the signals-based authentication computing platform 110 may determine whether the overall score associated with the user response data (e.g., from one or more sources) is at or above a threshold. In response to determining whether the overall score is at or above the threshold, authentication response data may be generated at step 235. For instance, the authentication response data may include a request for additional authentication data if the score is below the threshold. If the score is at or above the threshold, the authentication response data may include a signal, command or instruction to automatically authenticate the user.

At step 236, in arrangements in which the user is automatically authenticated, the authentication response data may be transmitted from the signals-based authentication computing platform 110 to the authentication device 130, 135. The authentication response data may include a signal, command or instruction to authenticate the user.

At step 237, the authentication response data may be executed by the authentication device 130, 135 and functionality and/or access may be enabled or displayed. For instance, responsive to executing the instruction, signal or command to automatically authenticate the user, functionality of the authentication device 130, 135 may be enabled or activated, selectable options may be displayed to the user, and the like. In arrangements in which the authentication device 130, 135 is a point-of-sale system, the requested transaction may be processed in response to receiving and executing the authentication response data. In arrangements in which the authentication device 130, 135 is a system controlling access to a building or secure area, the user may be provided access to the building or secure area responsive to receipt and execution of the authentication response data.

At step 238, authentication response data may also be transmitted to the remote user computing device 170. For instance, an indication that the user was authenticated may be transmitted to the remote user computing device 170 and displayed on the device at step 239.

Alternatively, if the authentication response data includes a request for additional authentication data, that authentication response data may be transmitted to the remote user computing device 170 and displayed on the display of the remote user computing device 170 at step 239. The user may then, in response to display of the notification, enter the requested additional authentication data (e.g., username and password, PIN, biometric data, and the like) into the remote user computing device 170 for transmission to the signals-based authentication computing platform 110 for evaluation.

FIG. 3 is a flow chart illustrating one example method of signals-based authentication according to one or more aspects described herein. The processes illustrated in FIG. 3 are merely some example processes and functions. The steps shown may be performed in the order shown, in a different order, more steps may be added, or one or more steps may be omitted, without departing from the invention.

At step 300, registration data may be received. As discussed herein, registration data may include user information (name, contact information, authentication information (e.g., username and password, PIN, biometric data such as fingerprint, voiceprint, and the like), user device information (international mobile equipment identity (IMEI)), payment information (e.g., device number, account number, and the like), biometric signature data (e.g., heart rate, respiratory rate, and the like, that may establish a baseline or expected value), and the like. Responsive to receiving the registration data, a new record may be generated and a data structure may be modified to include the new record.

At step 302, user device detection data may be received. For instance, an authentication device 130, 135 may detect, for instance, a mobile device of a user (e.g., smartphone, wearable device, fitness tracker, or the like) within a predefined proximity of the authentication device. In some examples, the user device detection data may include detection of more than one user device and data from all detected devices may be transmitted.

At step 304, a determination may be made as to whether the user device was detected for at least a threshold amount of time. If not, the signals-based authentication computing platform 110 may generate and transmit a signal to continue scanning at step 306 and may return to step 302 to detect another user device. In some examples, if the device was not detected for at least the threshold amount of time, no further process of the device or associated data may be performed.

If, at step 304, the device is detected for at least the threshold amount of time, at step 308, a request for user data may be generated. The request for user data may include a request for data associated with the user but that the user does not provide (e.g., no user input is required to obtain the user data). In some examples, the request may be transmitted to one or more sources of data, such as one or more mobile devices of the user (e.g., smartphone, wearable device, fitness tracker, or the like), one or more internal data sources (e.g., internal data computing system 120), authentication device 130, and/or one or more external data sources (e.g., external data computing system 145).

At step 310, user response data may be received from one or more of the sources to which the request for user data was transmitted. In some examples, the user response data may include biometric signature data (e.g., heart rate, respiratory rate, and the like) obtained from one or more mobile devices of the user. The user response data may further include historical data of the user, previous pattern data, location and timestamp data, and the like. In some examples, the user response data may be generated by or at the remote user computing device 170. In some arrangements, some or all of the user response data may be transmitted directly from the source device to the signals-based authentication computing platform 110. In other examples, some or all of the user response data may be transmitted to the authentication device 130, 135 and processed there or transmitted to the signals-based authentication computing platform 110.

At step 312, the user response data may be evaluated and a determination may be made as to whether a score, such as an overall confidence score, of the user response data is at or above a predetermined threshold. If so, the user may be automatically authenticated to the authentication device at step 314 and an instruction, command or signal may be generated and transmitted to the authentication device to authenticate the user, enable functionality, provide access or the like.

If, at step 312, the user response data score is below the predetermined threshold, a request for additional authentication information may be generated and transmitted to, for example, the user mobile device (e.g., remote user computing device 170) at step 316. For instance, if the confidence in the data is not sufficiently high to automatically authenticate the user, a request for additional authentication information, such as a username and password combination, PIN, biometric data such as a fingerprint, voiceprint, or the like, may be generated and transmitted to the mobile device of the user.

At step 318, the additional authentication information may be received and processed. At step 320, a determination may be made as to whether the received additional authentication information matches pre-stored authentication information. For instance, the system may determine whether the received additional authentication information matches authentication information provided at, for example, registration of the user. If so, the user may be authenticated at step 324. If not, the user will not be authenticated and a notification denying access may be generated and transmitted to the user.

Aspects described herein are directed to use of a user's signals-based footprint to automatically authenticate the user. As discussed herein, aspects are directed to detection of a user device, such as a smartphone, fitness tracker, wearable device, or the like, by an authentication device (e.g., ATM or other self-service kiosk, system for providing access to a building or secure area, point-of-sale device, or the like). Upon detecting the user device, the system may evaluate a length of time for which the user device was detected to determine or predict whether the user is attempting to interact with the authentication device (e.g., process an event, access the area, make a purchase, or the like) or is merely located nearby or passing by the device. If the length of time meets a threshold, user information may be requested. As discussed above, the user information may be requested from one or more sources (e.g., the user device, internal data devices, external data devices, and the like). In some examples, the user information may include biometric signature data (e.g., current heart rate, respiratory rate, or the like) captured by one or more user devices and transmitted for evaluation. If the biometric signature data (and/or other user information) matches or is within a range of pre-stored biometric signature data, the user may be automatically authenticated. Accordingly, in some examples, if the user is automatically authenticated, that may include authenticating the user to the user device without the user requesting authentication and/or without the user providing any input to the authentication device, user device or the like.

Because user data may be received from a plurality of sources, arrangements described herein may provide authentication with a high degree of accuracy (e.g., information including a plurality of authenticating data points may provide a high degree of accuracy in an authentication process) because it may be difficult or impossible for an unauthorized actor to duplicate all data points or elements of the authentication process described herein. In addition, the authentication may be performed with little or no user input and, accordingly, little or no inconvenience to the user.

As discussed herein, in some examples, user data received in response to detecting the user device for a predetermined time period may be evaluated to determine a confidence level in the data points. For instance, each data point (e.g., biometric signature data, location and time data matches pre-stored pattern, and the like) may be scored. In some examples, an exact match may be given a first score. Additionally or alternatively, a data point within a predefined range of the pre-stored, baseline or expected value may be given a second score different from the first score (e.g., if the first score is a highest score, the second score may be lower). In some examples, the score from all available data points may be summed to determine an overall confidence score or level. The overall confidence score or level may be compared to a threshold to determine whether the user should be automatically authenticated.

For instance, in some examples, if the overall confidence score indicates at least a certain level of confidence in the accuracy of the authentication (e.g., 75, 80, 95, or the like) the user may be automatically authenticated. If not, additional authentication information may be requested. The additional authentication information may include legacy authentication information such as a username and password combination, PIN, fingerprint, or the like.

In some examples, the threshold may be customizable to modifiable. For example, some users may desire to have a higher degree of confidence before automatically authenticating. Accordingly, those users may set the threshold at a higher value (e.g., 90, 95, 98 or the like). Additionally or alternatively, some users may desire to make it easier to automatically authenticate (e.g., to reduce inconvenience) so may set the threshold at a lower value (e.g., 75, 80, 88, or the like).

In some examples, if potential unauthorized activity is detected (e.g., user data does not match or is outside of an acceptable threshold from pre-stored or baseline data), the system may continue to gather information about the potential event or transaction to provide to law enforcement. For example, if current biometric signature data is captured and analyzed but is well outside of a range from the baseline or is not compatible with other biometric signature data captured at registration, potential unauthorized activity may be identified. If potential unauthorized activity is detected, the system may capture location data, time data, initiate camera functions at the authentication device, or the like, in order to provide additional details to law enforcement.

In some arrangements, if one or more data elements are outside of an expected value or range, additional user data may be requested from one or more other sources. For instance, if a current location of a user is outside of an expected area (e.g., based on calendar data, user pattern data, or the like), the system may request additional data in an attempt to authenticate the user. For instance, purchase data may be requested to determine whether the user was travelling, a location to which the user was travelling, or the like. If this information confirms the current location of the user, the user may be automatically authenticated. If not, additional authentication information may be requested.

As discussed herein, the user data, additional data, processing and analysis of data, and the like, may be performed with the permission of the user (e.g., permissions provided for example, upon registration).

In some examples, the system may capture and store data from one or more sources (e.g., user devices, internal databases, external databases, and the like) to build the user profile and/or learn about the user. For instance, frequently visited locations may be identified as a home location, work location, school location, and the like. Accordingly, authentication devices near these known locations may have expected interaction with the user and that may improve the confidence level for automatically authenticating users at those authentication devices. Additionally or alternatively, captured biometric signature data (e.g., data captured during an authentication process) may be stored with the originally captured (e.g., baseline) biometric signature data provided at registration to generate a more robust or accurate value or range of values acceptable for authentication.

As discussed herein, the arrangements described may be used to authenticate a user to access functionality at an ATM or self-service kiosk, gain access to a building or secure area, process an event or transaction at a point-of-sale system, or the like. In some examples, the arrangements described herein may also be used to process events and authenticate a user in online systems or accounts.

For instance, in some examples, a user may approach an ATM or self-service kiosk on a street. The ATM or self-service kiosk may be continuously scanning to detect, for example, various user devices. The system may determine whether the user is within a predefined proximity of the ATM or self-service kiosk for at least a threshold amount of time in order to determine that the user desires to use the ATM or self-service kiosk and is not merely walking by. Upon detecting the user for the threshold amount of time, user data may be requested. The user data may include biometric signature data requested from the user device that may be compared to pre-stored, baseline biometric signature data captured upon registration. Additionally or alternatively, GPS or other location data from the user device may be captured and compared to pre-stored or predicted patterns of locations, behaviors, and the like (e.g., based on machine learning). Additionally or alternatively, the authentication device may scan for radio frequency (RF) signals emitted from additional user devices (e.g., a smart watch, fitness tracker, or the like). These data points in combination (e.g., biometric signature data, RF signals from known devices, location, time, etc.) may be evaluated and scored to determine a confidence level. If the confidence level at least meets the threshold, the user may be automatically authenticated.

In another example arrangement, a user may approach a building having controlled access. As the user approaches the building, a smartphone of the user may be detected. If the smartphone is detected for at least a threshold amount of time, additional data may be requested from the smartphone and an authentication device may scan for signals associated with other devices of the user (e.g., smart watch, fitness tracker, or the like). If those signals are detected, the requested user information and detection of additional devices may be analyzed to determine whether the user should be automatically authenticated and gain access to the building (e.g., without user input, RFID tag verification, or the like). If so, the user may be granted access. If not, additional authentication information may be requested.

The above-described examples and arrangements are merely some example arrangements in which the systems described herein may be used. Various other arrangements employing aspects described herein may be used without departing from the invention.

Figure 4:
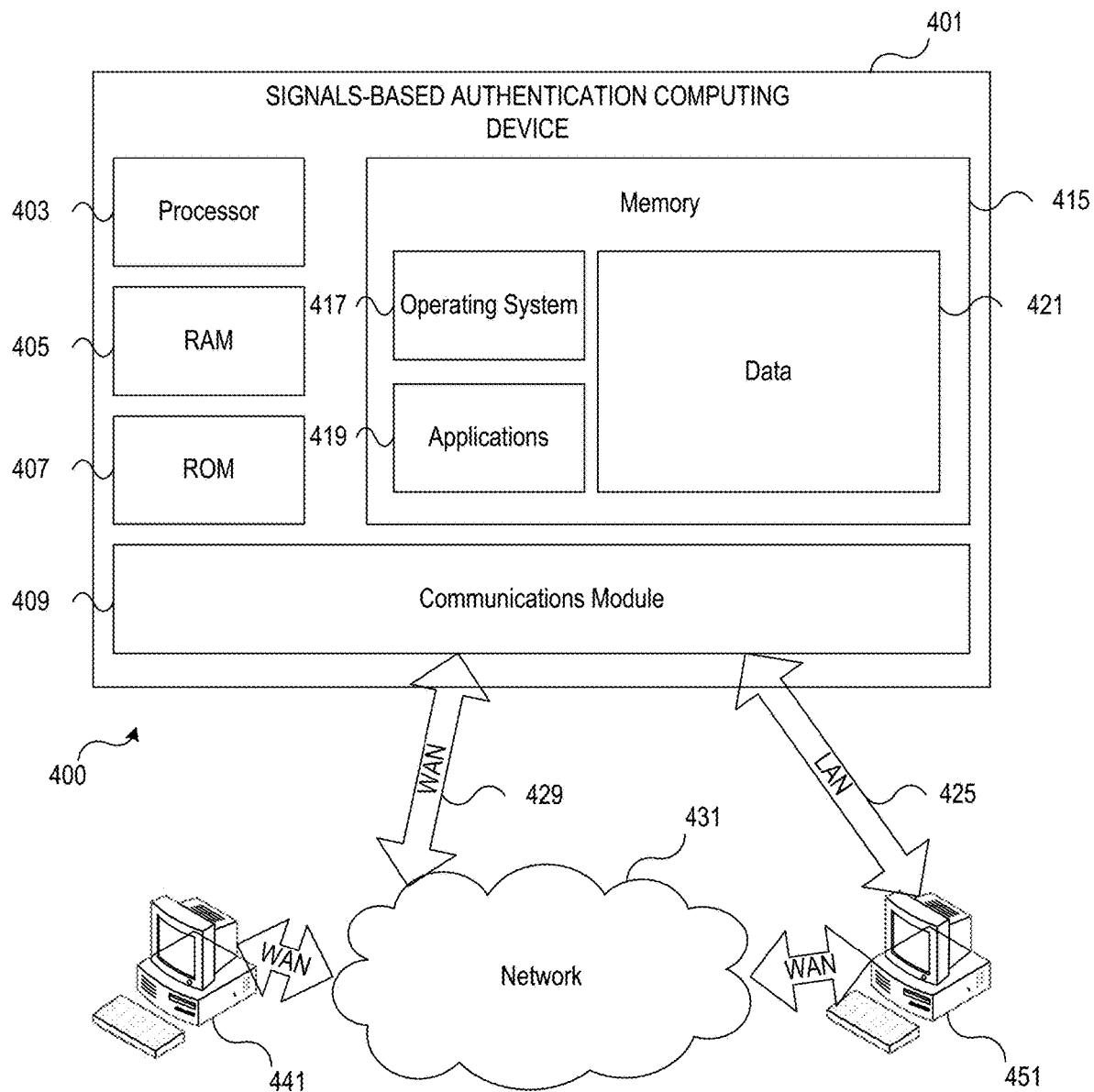
FIG. 4 illustrates one example operating environment in which various aspects of the disclosure may be implemented in accordance with one or more aspects described herein.

FIG. 4 depicts an illustrative operating environment in which various aspects of the present disclosure may be implemented in accordance with one or more example embodiments. Referring to FIG. 4, computing system environment 400 may be used according to one or more illustrative embodiments. Computing system environment 400 is only one example of a suitable computing environment and is not intended to suggest any limitation as to the scope of use or functionality contained in the disclosure. Computing system environment 400 should not be interpreted as having any dependency or requirement relating to any one or combination of components shown in illustrative computing system environment 400.

Computing system environment 400 may include signals-based authentication computing device 401 having processor 403 for controlling overall operation of signals-based authentication computing device 401 and its associated components, including Random Access Memory (RAM) 405, Read-Only Memory (ROM) 407, communications module 409, and memory 415. Signals-based authentication computing device 401 may include a variety of computer readable media. Computer readable media may be any available media that may be accessed by signals-based authentication computing device 401, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by signals-based authentication computing device 401.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on signals-based authentication computing device 401. Such a processor may execute computer-executable instructions stored on a computer-readable medium.

Software may be stored within memory 415 and/or storage to provide instructions to processor 403 for enabling signals-based authentication computing device 401 to perform various functions as discussed herein. For example, memory 415 may store software used by signals-based authentication computing device 401, such as operating system 417, application programs 419, and associated database 421. Also, some or all of the computer executable instructions for signals-based authentication computing device 401 may be embodied in hardware or firmware. Although not shown, RAM 405 may include one or more applications representing the application data stored in RAM 405 while signals-based authentication computing device 401 is on and corresponding software applications (e.g., software tasks) are running on signals-based authentication computing device 401.

Communications module 409 may include a microphone, keypad, touch screen, and/or stylus through which a user of signals-based authentication computing device 401 may provide input, and may also include one or more of a speaker for providing audio output and a video display device for providing textual, audiovisual and/or graphical output. Computing system environment 400 may also include optical scanners (not shown).

Signals-based authentication computing device 401 may operate in a networked environment supporting connections to one or more remote computing devices, such as computing devices 441 and 451. Computing devices 441 and 451 may be personal computing devices or servers that include any or all of the elements described above relative to signals-based authentication computing device 401.

The network connections depicted in FIG. 4 may include Local Area Network (LAN) 425 and Wide Area Network (WAN) 429, as well as other networks. When used in a LAN networking environment, signals-based authentication computing device 401 may be connected to LAN 425 through a network interface or adapter in communications module 409. When used in a WAN networking environment, signals-based authentication computing device 401 may include a modem in communications module 409 or other means for establishing communications over WAN 429, such as network 431 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 5:
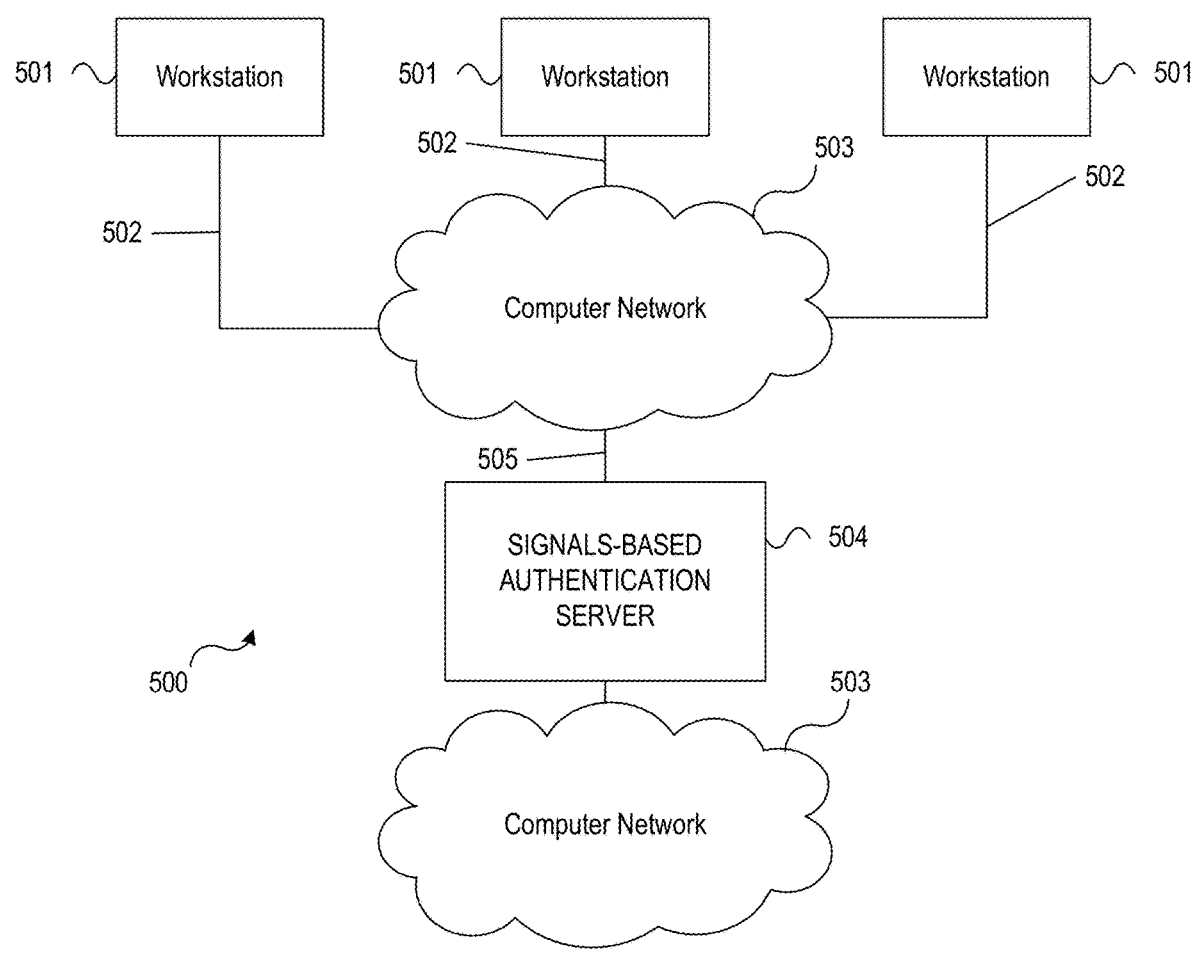
FIG. 5 depicts an illustrative block diagram of workstations and servers that may be used to implement the processes and functions of certain aspects of the present disclosure in accordance with one or more aspects described herein.

FIG. 5 depicts an illustrative block diagram of workstations and servers that may be used to implement the processes and functions of certain aspects of the present disclosure in accordance with one or more example embodiments. Referring to FIG. 5, illustrative system 500 may be used for implementing example embodiments according to the present disclosure. As illustrated, system 500 may include one or more workstation computers 501. Workstation 501 may be, for example, a desktop computer, a smartphone, a wireless device, a tablet computer, a laptop computer, and the like, configured to perform various processes described herein. Workstations 501 may be local or remote, and may be connected by one of communications links 502 to computer network 503 that is linked via communications link 505 to signals-based authentication server 504. In system 500, signals-based authentication server 504 may be a server, processor, computer, or data processing device, or combination of the same, configured to perform the functions and/or processes described herein. Server 504 may be used to receive and evaluate indications of device detection, generate requests for user data, process received user response data, authenticate a user, request additional authentication information, and the like.

Computer network 503 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 502 and 505 may be communications links suitable for communicating between workstations 501 and signals-based authentication server 504, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
receive, from an authentication device, an indication of a user device within a predefined area surrounding the authentication device;
determine, based on the received indication, whether the user device was within the predefined area for at least a threshold amount of time;
responsive to determining that the user device was not within the predefined area for at least the threshold amount of time, generate and transmit an instruction to continue a scan of the predefined area;
responsive to determining that the user device was within the predefined area for at least the threshold amount of time, generate and transmit a request for user data, the request for user data including at least a request for biometric signature data;
responsive to the request for user data, receive user response data;
evaluate the user response data to determine whether a confidence level of the user response data is at least a threshold level;
responsive to determining that the confidence level of the user response data is not at least the threshold level, generate and transmit a request for additional user authentication information; and
responsive to determining that the confidence level of the user response data is at least the threshold level, automatically authenticate a user associated with the user device to the authentication device.

2. The computing platform of claim 1, wherein the biometric signature data includes at least one of: heart rate and respiratory rate.

3. The computing platform of claim 2, further including instructions that, when executed, cause the computing platform to:
prior to receiving the indication of the user device within the predefined area surrounding the authentication device:
receive, from at least the user device, registration information of the user associated with the user device.

4. The computing platform of claim 3, wherein the registration information includes at least baseline biometric signature data.

5. The computing platform of claim 1, further including instructions that, when executed, cause the computing platform to:
generate and transmit an instruction to the authentication device causing the authentication device to continuously scan the predefined area surrounding the authentication device.

6. The computing platform of claim 1, wherein the predefined area surrounding the authentication device is five feet or less.

7. The computing platform of claim 1, wherein the request for user data is transmitted to a plurality of sources and wherein the plurality of sources includes at least the user device.

8. The computing platform of claim 1, wherein automatically authenticating the user includes authenticating the user without user input.

9. A method, comprising:
by a computing platform comprising at least one processor, memory, and a communication interface:
receiving, by the at least one processor and from an authentication device via the communication interface, an indication of a user device within a predefined area surrounding the authentication device;
determining, by the at least one processor and based on the received indication, whether the user device was within the predefined area for at least a threshold amount of time;
responsive to determining that the user device was not within the predefined area for at least the threshold amount of time, generating and transmitting, by the at least one processor and via the communication interface, an instruction to continue a scan of the predefined area;
responsive to determining that the user device was within the predefined area for at least the threshold amount of time, generating and transmitting, by the at least one processor and via the communication interface, a request for user data, the request for user data including at least a request for biometric signature data;
responsive to the request for user data, receiving, by the at least one processor, user response data;
evaluating, by the at least one processor, the user response data to determine whether a confidence level of the user response data is at least a threshold level;
responsive to determining that the confidence level of the user response data is not at least the threshold level, generating and transmitting, by the at least one processor and via the communication interface, a request for additional user authentication information; and
responsive to determining that the confidence level of the user response data is at least the threshold level, automatically authenticating, by the at least one processor, a user associated with the user device to the authentication device.

10. The method of claim 9, wherein the biometric signature data includes at least one of: heart rate and respiratory rate.

11. The method of claim 10, further including:
prior to receiving the indication of the user device within the predefined area surrounding the authentication device:
receiving, by the at least one processor and from at least the user device, registration information of the user associated with the user device.

12. The method of claim 11, wherein the registration information includes at least baseline biometric signature data.

13. The method of claim 9, further including:
generating and transmitting, by the at least one processor and via the communication interface, an instruction to the authentication device causing the authentication device to continuously scan the predefined area surrounding the authentication device.

14. The method of claim 9, wherein the predefined area surrounding the authentication device is five feet or less.

15. The method of claim 9, wherein the request for user data is transmitted to a plurality of sources and wherein the plurality of sources includes at least the user device.

16. The method of claim 9, wherein automatically authenticating the user includes authenticating the user without user input.

17. One or more non-transitory computer-readable media storing instructions that, when executed by a computing platform comprising at least one processor, memory, and a communication interface, cause the computing platform to:
receive, from an authentication device, an indication of a user device within a predefined area surrounding the authentication device;
determine, based on the received indication, whether the user device was within the predefined area for at least a threshold amount of time;
responsive to determining that the user device was not within the predefined area for at least the threshold amount of time, generate and transmit an instruction to continue a scan of the predefined area;
responsive to determining that the user device was within the predefined area for at least the threshold amount of time, generate and transmit a request for user data, the request for user data including at least a request for biometric signature data;
responsive to the request for user data, receive user response data;
evaluate the user response data to determine whether a confidence level of the user response data is at least a threshold level;
responsive to determining that the confidence level of the user response data is not at least the threshold level, generate and transmit a request for additional user authentication information; and
responsive to determining that the confidence level of the user response data is at least the threshold level, automatically authenticate a user associated with the user device to the authentication device.

18. The one or more non-transitory computer-readable media of claim 17, wherein the biometric signature data includes at least one of: heart rate and respiratory rate.

19. The one or more non-transitory computer-readable media of claim 18, further including instructions that, when executed, cause the computing platform to:
prior to receiving the indication of the user device within the predefined area surrounding the authentication device:
receive, from at least the user device, registration information of the user associated with the user device.

20. The one or more non-transitory computer-readable media of claim 19, wherein the registration information includes at least baseline biometric signature data.

21. The one or more non-transitory computer-readable media of claim 17, further including instructions that, when executed, cause the computing platform to:
generate and transmit an instruction to the authentication device causing the authentication device to continuously scan the predefined area surrounding the authentication device.

22. The one or more non-transitory computer-readable media of claim 17, wherein the predefined area surrounding the authentication device is five feet or less.

23. The one or more non-transitory computer-readable media of claim 17, wherein the request for user data is transmitted to a plurality of sources and wherein the plurality of sources includes at least the user device.

24. The one or more non-transitory computer-readable media of claim 17, wherein automatically authenticating the user includes authenticating the user without user input.

* * * * *